W. W. TRUE.
EVAPORATOR.
APPLICATION FILED AUG. 12, 1913.
1,096,328.
Patented May 12, 1914.
Fig. 1.
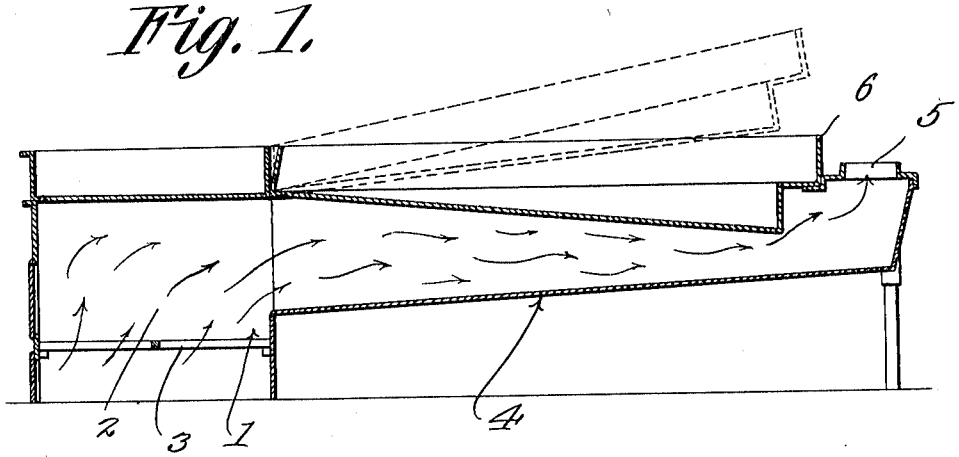
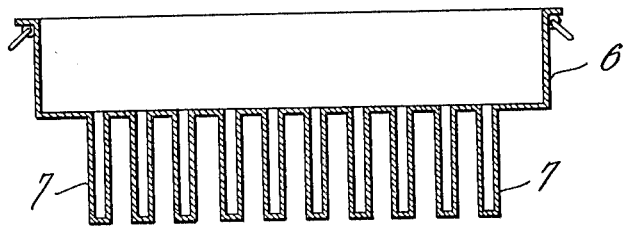
Fig. 2.
Witnesses
W. W. True
Inventor,
by C. A. Snow & Co.
Attorneys.

UNITED STATES PATENT OFFICE.

WILLIAM W. TRUE, OF NEWPORT, VERMONT.

EVAPORATOR.

1,096,328.   Specification of Letters Patent.   Patented May 12, 1914.

Application filed August 12, 1913. Serial No. 784,434.

*To all whom it may concern:*

Be it known that I, WILLIAM W. TRUE, a citizen of the United States, residing at Newport, in the county of Orleans and State of Vermont, have invented a new and useful Evaporator, of which the following is a specification.

This invention relates to evaporators of that type designed, for example, for use in the evaporation of maple sap. It has been the practice heretofore to utilize, for this purpose, an evaporating pan having depending sap-ways of uniform depth. These sap-ways which extend downwardly from the pan and into the path of the hot combustion products have been found objectionable because it has been a difficult matter to remove the sap from them.

An object of the present invention is to provide an evaporating pan having depending sap-ways of varying depths, the bottom of each sap-way being inclined downwardly from the level of the bottom of the pan so that, when the pan is tilted, the contents of these sap-ways will be free to flow therefrom, thus enabling the pan to be easily emptied.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawings the preferred form of the invention has been shown.

In said drawings:—Figure 1 is a vertical longitudinal section through an evaporator having combined therewith pans such as constitute the present invention. Fig. 2 is an enlarged transverse section through one of the pans.

Referring to the figures by characters of reference 1 designates a heater of any preferred construction, the structure illustrated including a fire pot 2 above a grate 3 and from which fire pot extends a large flue 4 having an outlet 5 for products of combustion at that end of the flue remote from the fire pot. The fire pot and the flue are adapted to support a desired number of evaporating pans such as constitute the present invention. As shown in the drawings, the pan 6 has a series of depending sap-ways 7, each sap-way gradually increasing in depth from one end to the other, the bottom of each sap-way at one end being flush with the bottom of the pan 6. Thus it will be seen that when the pans are in active positions, the sap-ways hang downwardly into the path of the combustion products so that said combustion products will be free to flow not only under the sap-ways, but also between them. When it is desired to drain the pan of its contents, that end of the pan from which the deepest portions of the sap-ways hang, is lifted, as shown by dotted lines in Fig. 1. Thus the contents of the sap-ways will be free to drain therefrom and through a suitable outlet, not shown, at one end of the pan. Obviously a sap-way such as herein described is advantageous as compared with sap-ways of uniform depth for the reason that, in order to remove all of the contents of sap-ways such as heretofore devised, it is necessary to completely overturn the pan.

What is claimed is:—

1. An evaporating pan having a plurality of depending sap-ways, the bottom of each sap-way being inclined from one end upwardly to the plane of the bottom of the pan.

2. An evaporating pan tiltable upon one end and having a plurality of depending sap-ways, the bottom of each sap-way being inclined upwardly from one end toward said first mentioned end of the pan and to the plane of the bottom of the pan.

In testimony that I claim the foregoing as my own, I have hereto affixed my signature in the presence of two witnesses.

WILLIAM W. TRUE.

Witnesses:
 JNO. W. WYMAN,
 CECIL V. SLATER.

Copies of this patent may be obtained for five cents each, by addressing the "Commissioner of Patents, Washington, D. C."